United States Patent [19]

Iizuka et al.

[11] Patent Number: 5,105,275

[45] Date of Patent: Apr. 14, 1992

[54] NOISE REDUCTION CIRCUIT FOR VIDEO SIGNAL RECORDING/REPRODUCTION DEVICE

[75] Inventors: Hiroshi Iizuka; Mituzou Shirai, both of Osaka, Japan

[73] Assignee: Sanyo Electric Co., Ltd., Japan

[21] Appl. No.: 646,099

[22] Filed: Jan. 25, 1991

[30] Foreign Application Priority Data

Jan. 31, 1990 [JP] Japan .................................... 2-22362

[51] Int. Cl.$^5$ ............................................ H04N 5/213
[52] U.S. Cl. ...................................... 358/167; 358/340
[58] Field of Search ........................... 358/167, 36, 340

[56] References Cited

U.S. PATENT DOCUMENTS

| | | | |
|---|---|---|---|
| 4,618,893 | 10/1986 | Hirota et al. | 358/167 |
| 4,626,927 | 12/1986 | Hirota et al. | 358/340 |
| 4,635,120 | 1/1987 | Ichinoi | 358/167 |
| 4,658,305 | 4/1987 | Tsushima | 358/167 |
| 4,750,037 | 6/1988 | Kido et al. | 358/167 |
| 4,860,105 | 8/1989 | Sakaguchi et al. | 358/167 |
| 4,885,639 | 12/1989 | Nakata et al. | 358/167 |
| 4,962,434 | 10/1990 | Matsuo | 358/340 |

FOREIGN PATENT DOCUMENTS 57-211885 12/1982 Japan .
59-158684 9/1984 Japan .
2206012 12/1988 United Kingdom .

*Primary Examiner*—James J. Goody
*Assistant Examiner*—Jeffrey S. Murrell
*Attorney, Agent, or Firm*—Peter L. Michaelson

[57] ABSTRACT

A reproduction system noise reduction circuit of a VTR is implemented in combination with a recursive type noise reduction circuit and a non-recursive type noise reduction circuit. The recursive type noise reduction circuit has a characteristic complimentary to that of a recording system vertical emphasis circuit to function as a vertical de-emphasis circuit subjecting a reproduced luminance signal to vertical de-emphasis. The non-recursive type noise reduction circuit cancels noise components without line correlation from the reproduced luminance signal subjected to vertical de-emphasis. It is not necessary to increase noise reduction amount in each noise reduction circuit because vertical de-emphasis and noise reduction are carried out individually. Therefore, degradation of vertical resolution and increase in raining-like noise are prevented.

3 Claims, 4 Drawing Sheets ns" NOISE REDUCTION CIRCUIT FOR VIDEO SIGNAL RECORDING/REPRODUCTION DEVICE

BACKGROUND OF THE INVENTION

1. Field of the Invention

The present invention relates to noise reduction circuits, and more particularly, to a noise reduction circuit for reducing noise included in a reproduced video signal from a video signal recording/reproduction device such as a video tape recorder (referred to as a VTR hereinafter).

2. Description of the Background Art

Video signal recording/reproduction devices such as VTRs are usually provided with noise reduction circuits for reducing noise within reproduced video signals generated while video signals are recorded onto a recording medium, such as a magnetic tape, and/or reproducing video signals therefrom. Generally, a video signal comprises a luminance signal (Y signal) and a chrominance signal (C signal) interleaved with each other at the interval of $\frac{1}{2} \cdot f_H$. In recording, such video signal is Y/C separated and the extracted luminance signal is processed by a luminance signal processing circuit to be recorded. When such luminance signal is recorded, chrominance signal components apart from a luminance signal spectrum by $\frac{1}{2} \cdot f_H$ may possibly remain in the luminance signal, and such chrominance signal components become noise components.

FIG. 1 is a block diagram schematically showing a non-recursive type noise reduction circuit which is an example of such conventional noise reduction circuits for reducing noise components.

Referring to FIG. 1, a reproduced luminance signal as a reproduced video signal, including noise, provided from a reproduction system circuit (not shown) of a VTR for example, is applied to an 1H delay line 2 implemented with a CCD delay line for example, via an input terminal 1, to be delayed by 1H period (H: horizontal period of a video signal). The delay line is not limited to 1 delay line, and may be any nH (n: natural number) delay line. The reproduced luminance signal delayed by 1H period in 1H delay line 2 is applied to a negative input terminal of a subtractor 3.

The current reproduced luminance signal provided to input terminal 1 is applied to a positive input terminal of subtractor 3, as well as to a positive input terminal of a subtractor 6. Subtractor 3 subtracts the reproduced luminance signal 1H-delayed by 1H delay line 2 from the current reproduced luminance signal which is provided from input terminal 1. Because the video information of the vertical direction and reducing noise, where the level of a signal component not having line correlation is emphasized, i.e., vertical emphasis is applied to a luminance signal to record a video signal on a magnetic tape, and the reproduced luminance signal is passed through a recursive type noise reduction circuit at the time of reproduction. A recursive type noise reduction circuit employed in such VTRs is disclosed in Japanese Patent Laying-Open No. 57-211885 and 59-158684, for example. FIG. 2 is a block diagram schematically showing such a conventional recursive type noise reduction circuit.

Referring to FIG. 2, a reproduced luminance signal, including noise, provided from a reproduction system circuit (not shown) of a VTR is applied to a positive input terminal of a subtractor 9 and a positive input terminal of a subtractor 13, via an input terminal 8. Subtractor 9 subtracts the reproduced luminance signal supplied from a 1H delay line 10 from the reproduced luminance signal to extract a component not having line correlation (mainly the noise component).

The extracted component is provided to an attenuator 12 having an arbitrary attenuation coefficient via a limiter 11, where the level is attenuated. The attenuated component is then applied to a negative input terminal of reproduced luminance signals having 1H period interval are in close approximity, i.e. have line correlation, noise components not related to video information (no line correlation) are extracted from subtractor 3.

The extracted noise component has the amplitude thereof limited via a limiter 4 to be applied to an attenuator 5 where its level is attenuated. The noise component is then applied to a negative input terminal of subtractor 6. The positive input terminal of subtractor 6 is supplied with the current reproduced luminance signal from input terminal 1. Subtractor 6 subtracts the noise component from the current reproduced luminance signal. Thus, a reproduced luminance signal having the noise component reduced is provided via an output terminal 7.

With the noise reduction circuit of the non-recursive type of FIG. 1, not only the noise components but also the signal components not having line correlation are canceled from the reproduced luminance signal by subtractor 6. The resolution in the vertical direction of the reproduced picture is therefore degraded with pictures having blurred edges. Because this phenomenon is noticeable where noise reduction effect is increased, the SN ratio could not be improved sufficiently in the non-recursive type noise reduction circuit of FIG. 1.

A VTR has been proposed for simultaneously performing de-emphasis in the subtractor 13. The positive input terminal of subtractor 13 is supplied with the current reproduced luminance signal from input terminal 8, whereby subtractor 13 subtracts the component without line correlation from the current reproduced luminance signal. Thus, the reproduced luminance signal having the noise component reduced and the signal component without line correlation emphasized at the time of recording but now de-emphasized is applied to an output terminal 14, and to a 1H delay line 10. A series of the above mentioned operation is repeated thereafter.

The recursive type noise reduction circuit of FIG. 2 implements a closed-loop in which the reproduced luminance signal provided from output terminal 14 is fed-back to 1H delay line 10. The noise components are reduced according to the attenuation coefficient of attenuator 12, and the signal components without line correlation are de-emphasized to improve the SN ratio significantly.

The noise reduction rate in the recursive type noise reduction circuit of FIG. 2 is great because de-emphasis in the vertical direction and reduction of the noise components are simultaneously carried out with one circuit. This results in degradation of the resolution of the reproduced picture in the vertical direction as mentioned before. Also, the noise components having line correlation which were not reduced as described above is particularly emphasized, leading to a problem of raining-like trails in the vertical direction on the reproduced picture called "raining noise".

SUMMARY OF THE INVENTION

An object of the present invention is to provide a noise reduction circuit of a video signal recording/reproduction device which prevents degradation in vertical resolution in reproduced pictures.

Another object of the present invention is to provide a noise reduction circuit of a video signal recording/reproduction device which suppresses the increase of "raining noise" in reproduced pictures.

A further object of the present invention is to simplify the structure of a noise reduction circuit of a video signal recording/reproduction device.

Briefly stated, the present invention is a noise reduction circuit for a video signal recording/reproduction device, wherein the video signal recording/reproduction device includes vertical emphasis means of a non-recursive type for applying vertical emphasis to a video signal at the time of recording. The noise reduction circuit includes a first noise reduction circuit of a recursive type and a second noise reduction circuit of a non-recursive type. The first recursive type noise reducing circuit functions as a vertical de-emphasis circuit subjecting reproduced video signals to vertical de-emphasis with a characteristic complimentary to that of the vertical emphasis circuit. The second non-recursive type noise reduction circuit cancels noise components without line correlation from the reproduced video signal.

The main advantage of the present invention lies in that by subjecting the reproduced video signal to vertical de-emphasis with the recursive type noise reduction circuit as well as reducing noise components with the non-recursive type noise reduction circuit in reproducing a video signal subjected to vertical emphasis at the time of recording it is not necessary to increase the noise reduction amount of the noise reduction circuit to suppress both degradation in vertical resolution and increase in raining-like noise.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
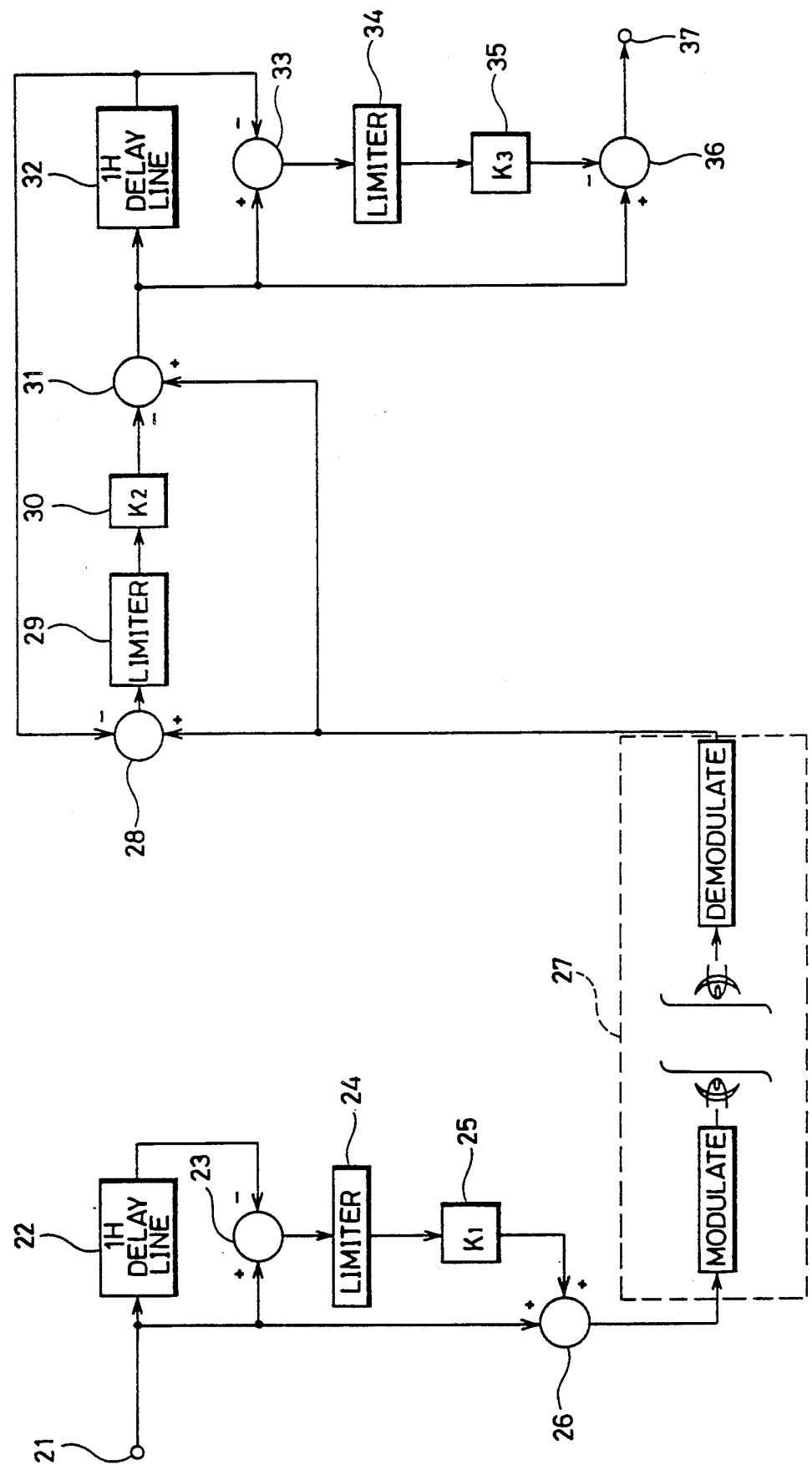
FIG. 3 is a block diagram schematically showing a noise reduction circuit according to a first embodiment of the present invention.

FIG. 3 is a block diagram schematically showing a noise reduction circuit of a VTR according to a first embodiment of the present invention. Referring to FIG. 3, a luminance signal to be recorded provided from a recording system circuit (not shown) of a VTR for example, is applied to a 1H delay line 22, implemented with a CCD delay line or the like, through an input terminal 21 to be delayed by 1H. The 1H-delayed luminance signal is supplied to a negative input terminal of a subtractor 23.

The current luminance signal provided to input terminal 21 is applied to a positive input terminal of subtractor 23 as well as to one input terminal of an adder 26. Subtractor 23 subtracts the luminance signal delayed by 1H at 1H delay line 22 from the current luminance signal from input terminal 21 to provide a signal component without line correlation.

The extracted signal component without line correlation is applied to a multiplier 25 having a coefficient of K1 via a limiter 24 to be attenuated in level. The resulting level attenuated multiplied signal component is then applied to the other input terminal of adder 26. Adder 26 adds the signal component without line correlation to the current luminance signal. Hence, a luminance signal having an emphasized signal component without line correlation emphasized is provided from adder 26.

Input terminal 21, 1H delay line 22, subtractor 23, limiter 24, multiplier 25 and adder 26 constitute a non-recursive type vertical emphasis circuit which applies a vertical emphasis to a luminance signal in a luminance signal recording system of a VTR.

The vertical-emphasized luminance signal provided from adder 26 is applied to a recording/reproduction system 27 inclusively showing a recording system modulation circuit, a recording system magnetic head, a magnetic tape, a magnetic head for reproduction, a reproduction system demodulation circuit and the like, and is recorded in the magnetic tape.

The vertically emphasized luminance signal, and including noise generated at the time of recording/reproduction, which is reproduced from the magnetic tape at the time of reproduction, is applied to a positive input terminal of a subtractor 28 as well as to a positive input terminal of a subtractor 31. Subtractor 28 subtracts the reproduced luminance signal provided from a 1H delay line 32 from the reproduced luminance signal to extract a component without line correlation (mainly noise component).

The extracted component is applied to a multiplier 30 of a coefficient of K2 via a limiter 29 to have its level resulting attenuated multiplied. The attenuated component is then applied to a negative input terminal of a subtractor 31. The positive input terminal of subtractor 31 is supplied with the current reproduced luminance signal, whereby the component without line correlation is subtracted from the current reproduced luminance signal. Thus, a reproduced luminance signal without the component having reduced line correlation is applied to positive input terminals of subtractors 33 and 36, as well as to 1H delay line 32. Thereafter, the above described series of operation is repeated.

Subtractor 28, limiter 29, multiplier 30, subtractor 31 and 1H delay line 32 constitute a recursive type noise reduction circuit. If coefficient K2 of multiplier 30 of the recursive type noise reduction circuit of the reproduction side is set to have a characteristic complimentary to that of coefficient K1 of the non-recursive type vertical emphasis circuit of the recording side, the recursive type noise reduction circuit of the reproduction side functions substantially as a vertical de-emphasis circuit subjecting a luminance signal to de-emphasis in the vertical direction.

The reproduced luminance signal provided from subtractor 31 subjected to vertical de-emphasis is delayed by 1H in 1H delay line 32 and applied to the negative input terminal of subtractor 33. Subtractor 33 subtracts the reproduced luminance signal delayed by 1H from the reproduced luminance signal supplied from subtractor 31 to extract a noise component without line correlation.

The extracted noise component is applied to a multiplier 35 of a coefficient K3 via a limiter 34 to be attenuated in level. The noise component is then applied to the negative input terminal of a subtractor 36. The positive input terminal of subtractor 36 is supplied with a reproduced luminance signal from subtractor 31, whereby subtractor 36 further subtracts the noise component from the reproduced luminance signal subjected to vertical de-emphasis. The reproduced luminance signal having the noise component reduced is provided from an output terminal 37. 1H delay line 32, subtractor 33, limiter 34, multiplier 35 and subtractor 36 constitute a non-recursive type noise reduction circuit.

Figure 1:
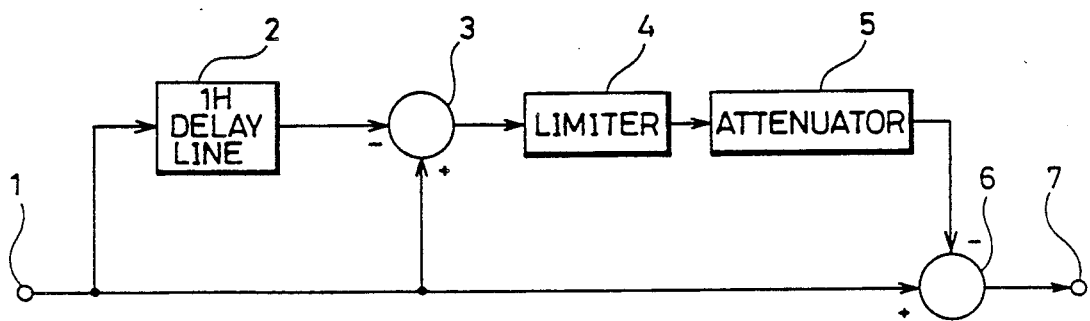
FIG. 1 is a block diagram schematically showing a conventional non-recursive type noise reduction circuit.
Figure 2:
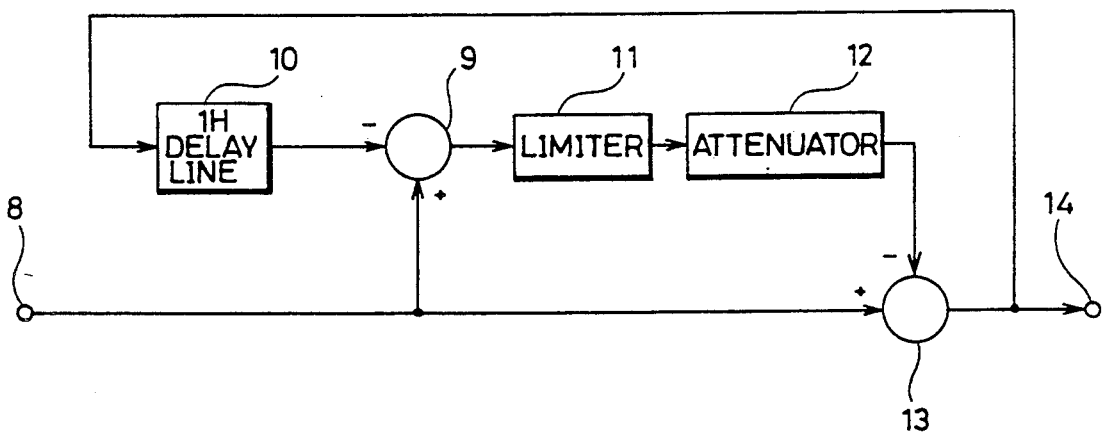
FIG. 2 is a block diagram schematically showing a conventional recursive type noise reduction circuit.

In accordance with the first embodiment, the recursive type noise reduction circuit of the preceding stage of the reproduction system performs mainly de-emphasis in the vertical direction to eliminate the need to increase the noise reduction amount of this recursive type noise reduction circuit, in comparison with the conventional example of FIG. 2 where vertical de-emphasis and noise reduction are carried out simultaneously. Therefore degradation of vertical resolution and increase of raining-like noise arising from the noise reduction circuit can be suppressed. The non-recursive type noise reduction circuit of the succeeding stage performs mainly reduction of noise components, allowing noise component reduction without particularly increasing the noise reduction amount of this non-recursive type noise reduction circuit. Therefore, noise having line correlation is not emphasized, and raining-like noise arising from this noise reduction circuit does not occur.

Figure 4:
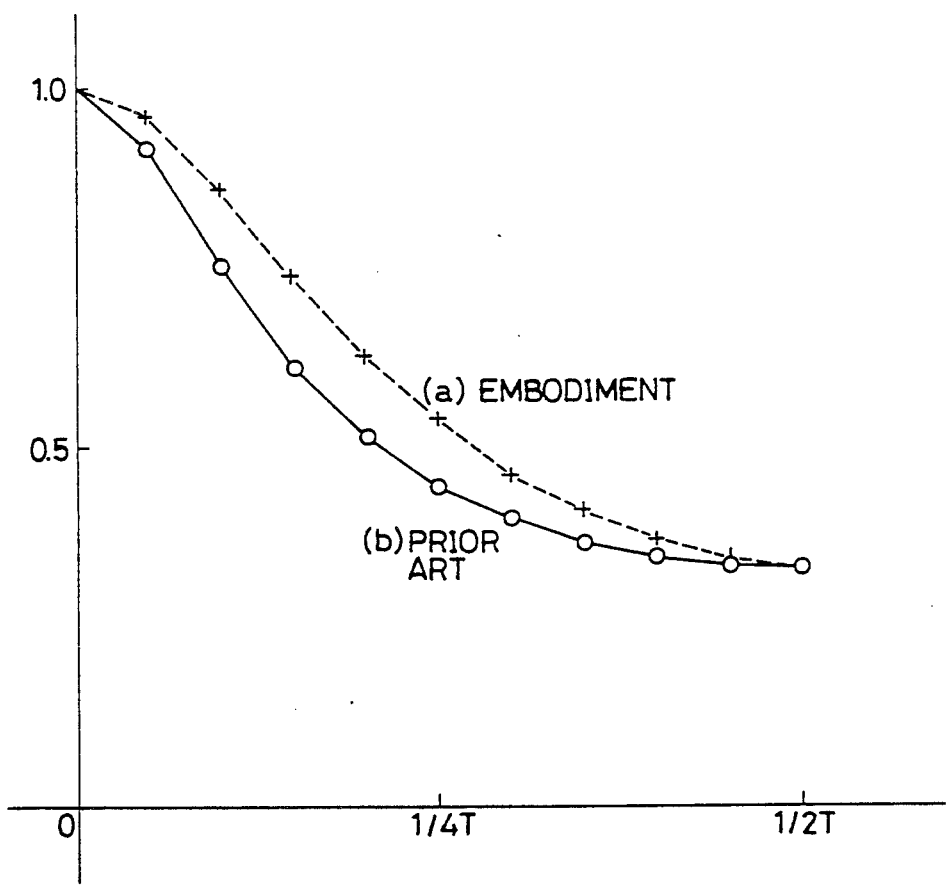
FIG. 4 is a graph for explaining the operational characteristics of the first embodiment of FIG. 3.

FIG. 4 is a graph explaining the operation characteristic of the first embodiment of FIG. 3 in comparison with the conventional example of FIG. 2. The operation of the first embodiment will be explained in details with reference to FIGS. 3 and 4.

The transfer function of the non-recursive type recording system vertical emphasis circuit implemented with elements 21 to 26 of FIG. 3 is derived as in the following manner.

First, the following equation is established between input luminance signal $V_{21}$ at input terminal 21 and output $V_{26}$ of adder 26.

$$V_{26}(t) = V_{21}(t) + K1(V_{21}(t) - V_{21}(t-T)) \quad (1)$$

where T represents 1H period.

The transfer function $H_{26}(\omega)$ of the recording system vertical emphasis circuit is expressed as below.

$$\begin{aligned} H_{26}(\omega) &= V_{26}(\omega)/V_{21}(\omega) \\ &= 1 + K1 - K1 \cdot \exp(-sT) \end{aligned} \quad (2)$$

The transfer function of the recursive type reproduction system vertical de-emphasis circuit implemented with elements 28 to 32 is derived as in the following manner.

First, the following equation is established between reproduced luminance signal $V_{27}$ provided from recording/reproduction system 27 and output $V_{31}$ of subtractor 31.

$$V_{31}(t) = V_{27}(t) - K2(V_{27}(t) - V_{31}(t-T)) \quad (3)$$

The transfer function $H_{31}(\omega)$ of the reproduction system vertical de-emphasis circuit is expressed as below.

$$\begin{aligned} H_{31}(\omega) &= V_{31}(\omega)/V_{27}(\omega) \\ &= (1 - K2)/(1 - K2 \cdot \exp(-sT)) \end{aligned} \quad (4)$$

The transfer function of the non-recursive type reproduction system noise reduction circuit implemented with elements 32 to 37 is derived as in the following manner.

First, the following equation is established between reproduced luminance signal $V_{31}$ provided from subtractor 31 subjected to vertical de-emphasis and output luminance signal $V_{37}$ at output terminal 37.

$$V_{37}(t) = V_{31}(t) - K3(V_{31}(t) - V_{31}(t-T)) \quad (1)$$

The transfer function $H_{37}(\omega)$ of the reproduction system noise reduction circuit is expressed as below.

$$\begin{aligned} H_{37}(\omega) &= V_{37}(\omega)/V_{31}(\omega) \\ &= 1 - K3 + K3 \cdot \exp(-sT) \end{aligned} \quad (6)$$

In view of the foregoing, K1 and K2 should be determined to establish the relationship of:

$$H_{26}(\omega) \times H_{31}(\omega) = 1 \quad (7)$$

for the characteristic of the recording system vertical emphasis circuit to be complimentary to that of the reproduction system vertical de-emphasis circuit.

That is to say, from the above equations of (2), (4) and (7), K1 and K2 k should be determined to establish:

$$K1 \approx K2/(1-K2) \quad (8)$$

By determining K1 and K2 as in the above equation, degradation of vertical resolution and increase of raining-like noise arising from the recursive type vertical de-emphasis circuit can be suppressed while carrying out vertical de-emphasis.

FIG. 4 is a graph showing the frequency-amplitude characteristics where K1=0.5, K2=0.33, and K3=0.164 in the structure of FIG. 3, in comparison with the conventional example of FIG. 2. The recursive type noise reduction circuit shown in the conventional example of FIG. 2 does not include the elements corresponding to elements 33 to 36 of FIG. 3. Also, it is assumed that the attenuation coefficients K1 and K2 of the recording system and the reproduction system are both specified as 0.5. In the convention example, $K1 \leq K2 / (1-K2)$. Accordingly, the de-emphasis amount of the vertical direction in the reproduction system is greater than the emphasis amount of the vertical direction in the recording system.

Referring to broken line representing the first embodiment and solid line b representing the conventional example in FIG. 4, the pass-band of a reproduced luminance signal of the first embodiment is wider than that of the conventional example to allow passage of original reproduced luminance signals in a wider range when the attenuation amounts of the amplitudes between frequencies apart from each other by $(\frac{1}{2})f_H$ ($f_H$: horizontal frequency) are the same.

This means that the noise component having a frequency of $(\frac{1}{2}) f_H$ deviated from the reproduced luminance signal is canceled by the non-recursive type noise reduction circuit of the succeeding stage to eliminate the need to increase the noise reduction amount of the reproduction system vertical de-emphasis circuit, which is a recursive type noise reduction circuit, as much as in the recursive type noise reduction circuit (FIG. 2) of the conventional example. Therefore, degradation of vertical resolution and increase of raining-like noise arising from the reproduction system vertical de-emphasis circuit are suppressed.

The entire circuit structure of the embodiment of FIG. 3 is simplified by feature of the recursive type vertical de-emphasis circuit and the non-recursive type noise reduction circuit sharing a common 1H delay line 32.

Figure 5:
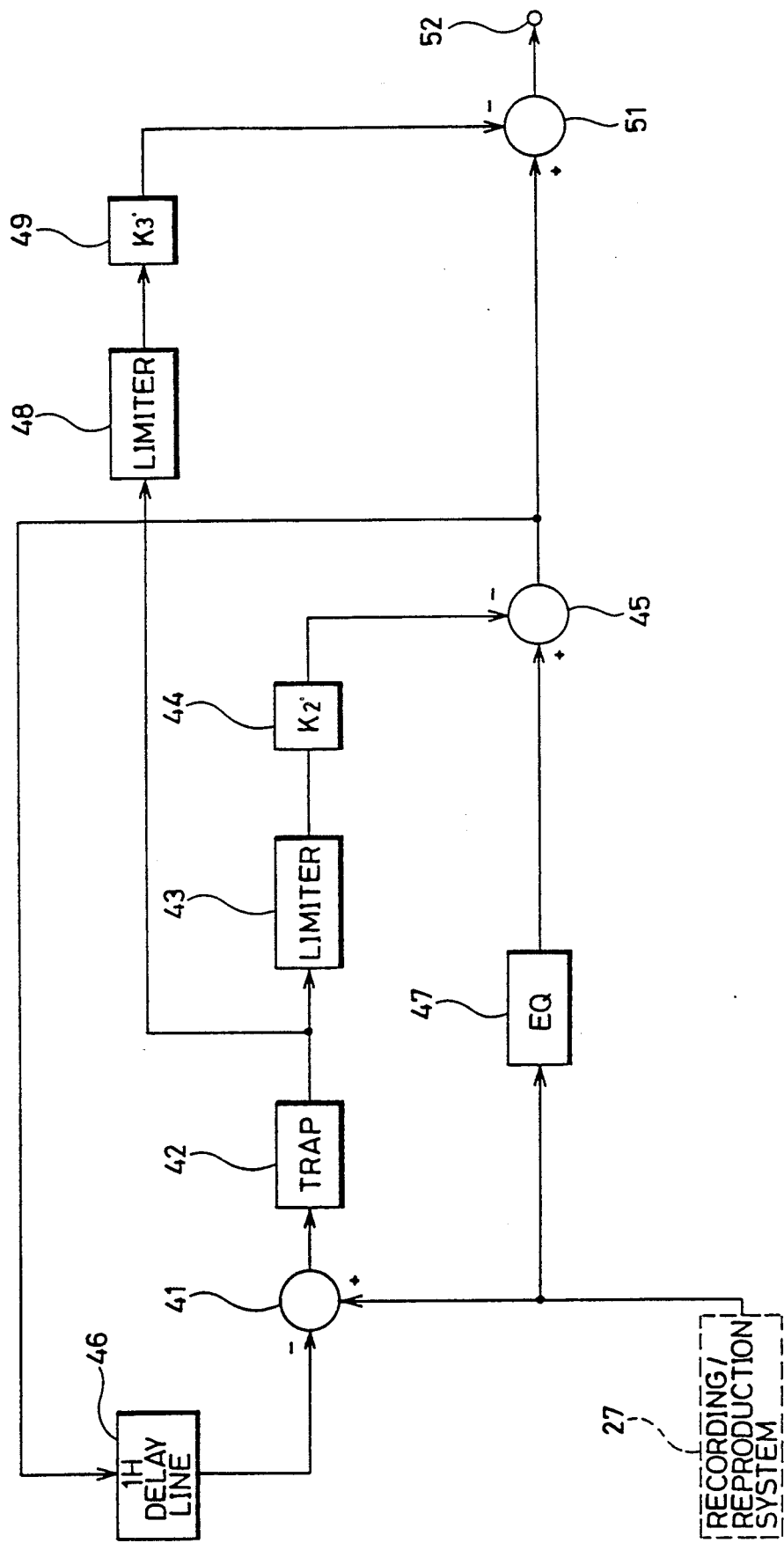
FIG. 5 is a block diagram schematically showing a noise reduction circuit according to a second embodiment of the present invention.

FIG. 5 is a block diagram schematically showing a noise reduction circuit of a second embodiment of the present invention. Depiction of the recording system emphasis circuit (elements 21 through 26 of FIG. 3) of the preceding stage of recording/reproduction system 27 is omitted in FIG. 5, and the description thereof is not repeated.

The embodiment of FIG. 5 is basically formed by a recursive type noise reduction circuit of the preceding stage and a non-recursive type noise reduction circuit of the succeeding stage in a manner formed by similar to the aforementioned first embodiment. The difference from the first embodiment of FIG. 3 is that the second embodiment is implemented to share one adder as adders 28 and 33 of FIG. 3.

Referring to FIG. 5, a luminance signal, subjected to vertical emphasis and including noise, provided from recording/reproduction system 27 at the time of reproduction is applied to a positive input terminal of a subtractor 41, as well as to a positive input terminal of a subtractor 45 via a delay equalizer EQ. Subtractor 41 subtracts the output of a 1H delay line 46 from the reproduced luminance signal to extract a component not having line correlation. A chrominance signal resulting from the interleaving at the time of recording may possibly remains in the extracted component. Therefore, at the time of reproducing, there is a possibility that the remaining chrominance signal may be emphasized by the non-recursive type and recursive type noise reduction circuits at the succeeding stage due to phase sift of the 1H delay line or the like. As a result, at the time of reproducing, the extracted component has the chrominance carrier removed by a trap circuit 42 which traps a signal of the subcarrier frequency $f_{SC}$ (3.58 MHz) of a chrominance signal. This prevents leakage of chrominance signals and flicker at edge portions on the color picture arising from non-recursive type noise reduction circuits The aforementioned delay equalizer EQ 47 is provided for the purpose of adjusting the time lag due to trap circuit 42.

The component without line correlation provided from trap circuit 42 is applied to a multiplier 44 of a coefficient K2' via a limiter 43 to be attenuated in level. The resulting attenuated multiplied component is then applied to a negative input terminal of subtractor 45. The positive input terminal of subtractor 45 is supplied with a reproduced luminance signal from recording/reproduction system 27. Subtractor 45 subtracts the component without line correlation from the current reproduced luminance signal. Thus, a reproduced luminance signal without the component having reduced line correlation is applied to the positive input terminal of subtractor 51, as well as to a 1H delay line 46. The above-mentioned series of operation is repeated thereafter. As set in the foregoing, subtractor 41, trap circuit 42, limiter 43, multiplier 44, subtractor 45, 1H delay line 46 and delay equalizer EQ 47 constitute a recursive type noise reduction circuit (vertical de-emphasis circuit).

The noise component without line correlation provided from trap circuit 42 is applied to a multiplier 49 of a coefficient K3' via a limiter 48 to be attenuated in level. The resulting attenuated multiplied component is then applied to the negative input terminal of subtractor 51. The positive input terminal of subtractor 51 is supplied with a reproduced luminance signal from subtractor 45. Subtractor 51 subtracts the noise component from the reproduced luminance signal subjected to vertical de-emphasis. Thus, 1H delay line 46, subtractor 41, trap circuit 42, limiter 48, multiplier 49 and subtractor 51 constitute a non-recursive type noise reduction circuit.

In the second embodiment, the coefficient K2' of multiplier 44 is preferably K2'<1.0. Particularly, K2' <0.5 is normally set. Coefficient K3' of multiplier 49 is set to K3'<0.5.

The multiplier 49 of the second embodiment is different from the multiplier 35 of the first embodiment in that the multiplier 49 receives as an input the noise component extracted from the recursive type noise reduction circuit. As a result, according to the second embodiment, the amount of the noise component supplied to the noise reduction circuit at the succeeding stage is increased in comparison with the first embodiment. Accordingly, the coefficient K3' of the multiplier 49 of the second embodiment is set to be smaller than the coefficient K3 of the multiplier 35 of the first embodiment. For example, when the coefficient K3 of the multiplier 35 of the first embodiment is set to 0.164, the coefficient K3' of the multiplier 49 of the second embodiment is set to approximately 0.15.

In the above-mentioned first and second embodiments, each of the recursive type noise reduction circuit and the non-recursive type noise reduction circuit comprises a limiter and a multiplier. By adjusting the characteristics thereof, it is possible to implement the order of the recursive type noise reduction circuit and the non-recursive type noise reduction circuit in reverse.

Furthermore, the delay line in each embodiment is not limited to a 1H delay line and may be nH (n : natural number) delay line.

As set forth in the foregoing, in reproducing luminance signals subjected to vertical emphasis at the time of recording, reproduced luminance signals are subjected to vertical de-emphasis with a recursive type noise reduction circuit as well as to reduction of noise components with a non-recursive type noise reduction circuit in reproducing luminance signals subjected to vertical emphasis at the time of recording, in order to eliminate the need to increase the noise reduction amount of each noise reduction circuit for suppressing both degradation in vertical resolution and increase of raining-like noise.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A noise reduction circuit for a video signal recording/reproduction device for reproducing a video signal, wherein the video signal has been recorded with vertical emphasis, said noise reduction circuit comprising:

first noise reduction means of a recursive type for subjecting a vertically emphasized video signal reproduced by the video signal recording/reproduction device to vertical de-emphasis with a complementary characteristic to that of the vertical emphasis to yield a vertically de-emphasized version of said vertically emphasized video signal, said first noise reduction means comprising:

first subtracting means for receiving said reproduced vertically emphasized video signal as a positive input, second subtracting means for receiving said reproduced vertically emphasized video signal as a positive input, delay means for delaying an output of said second subtracting means by nH periods (where n is a natural number and H is a horizontal period of the video signal), wherein said first subtracting means receives an output of said delay means as a negative input for subtracting the output of said delay means from said reproduced vertically emphasized video signal, and said first noise reduction means further comprises:

first limiter means for limiting an amplitude of an output of said first subtracting means, first multiplying means for attenuating an output of said first limiter means by a first coefficient (K2), wherein said second subtracting means receives an output of said first multiplying means as a negative input and subtracts the output of said first multiplying means from said reproduced vertically emphasized video signal, and said noise reduction circuit further comprises:

second noise reduction means of a non-recursive type for canceling a noise component, having substantially no line correlation, from the vertically de-emphasized version of the reproduced video signal, said second noise reduction means comprising:

third subtracting means for subtracting the output of said delay means from the output of said second subtracting means, second limiter means for limiting an amplitude of an output of said third subtracting means, second multiplying means for attenuating an output of said second limiter means by a second coefficient (K3), and fourth subtracting means for subtracting an output of said second multiplying means from the output of said second subtracting means to yield an output video signal having a reduced noise content.

2. The noise reduction circuit according to claim 1, wherein said video signal recording/reproduction device comprises vertical emphasis means for subjecting a video signal to be recorded to vertical emphasis during recording, said vertical emphasis means comprising:

means for delaying said video signal to be recorded by bH periods (where b is a natural number) so as to form a delayed video signal and subtracting the delayed video signal from the video signal to be recorded, third limiter means for limiting an amplitude of an output of said delaying and subtracting means, third multiplying means for attenuating an output of said third limiter means by a third coefficient (K1), and adding means for adding an output of said third multiplying means to said video signal to be recorded to yield a vertically emphasized video signal, wherein said first coefficient (K2) and said third coefficient (K1) are selected so that the relationship of $$K1 \simeq K2/(1-K2)$$

is established between said first coefficient (K2) of said first multiplying means and said third coefficient (K1) of said third multiplying means.

3. A noise reduction circuit for a video signal recording/reproduction device for reproducing a video signal wherein the video signal has been recorded with vertical emphasis, said noise reduction circuit comprising:

first noise reduction means of a recursive type for subjecting a vertically emphasized video signal reproduced by the video signal recording/reproduction device to vertical de-emphasis with a complementary characteristic to that of the vertical emphasis to yield a vertically de-emphasized version of the reproduced vertically emphasized video signal, said first noise reduction means comprising:

first subtracting means for receiving said reproduced vertically emphasized video signal as a positive input, second subtracting means for receiving said reproduced vertically emphasized video signal as a positive input, delay means for delaying an output of said second subtracting means by nH periods (where n is a natural number and H is a horizontal period of the video signal), wherein said first subtracting means receives an output of said delay mans as a negative input for subtracting the output of said delay means from said reproduced vertically emphasized video signal, and said first noise reduction means further comprises:

first limiter means for limiting an amplitude of an output of said first subtracting means, first multiplying means for attenuating an output of said first limiter means by a first coefficient (K2'), wherein said second subtracting means receives an output of said first multiplying means as a negative input and subtracts the output of said first multiplying means from said reproduced vertically emphasized video signal, and said noise reduction circuit further comprises:

second noise reduction means of a non-recursive type for canceling a noise component, having substantially no line correlation, from the vertically de-emphasized version of the reproduced video signal, said second noise reduction means comprising:

second limiter means for limiting an amplitude of an output of said first subtracting means, second multiplying means for attenuating an output of said second limiter means by a second coefficient (K3'), and third subtracting means for subtracting an output of said second multiplying means from the output of said second subtracting means to yield an output video signal having a reduced video noise content.

* * * * *